3,536,264
REMOVAL OF TITANIUM IMPURITIES FROM CLAY
Bernard L. Helton, Jr., and Robert E. Davis, Jr., Sandersville, and Robert F. Billue, Tennille, Ga., assignors to Thiele Kaolin Company, Dansersville, Ga., a corporation of Georgia
No Drawing. Filed June 11, 1968, Ser. No. 735,966
Int. Cl. B02c 17/00, 19/12; B03d 3/00
U.S. Cl. 241—4                    17 Claims

ABSTRACT OF THE DISCLOSURE

Titanium mineral impurities are removed from kaolinitic clay by forming a high solids aqueous dispersion of the clay using the normal amount of dispersing agent, and permitting the titanium minerals to settle out of the suspension. The clay having a reduced titanium minerals content is recovered as suspended clay.

---

This invention relates to a clay having improved brightness and a method of producing such a clay. More specifically, this invention relates to a method of removing a substantial portion of the titanium minerals contained as impurities in kaolin clays to produce a clay, suitable for coating paper, having markedly greater brightness and whiter color.

The coloring of natural clays varies considerably even among clays which come from the same or adjacent mines. Natural clays, and particularly kaolin clays, contain iron and titanium minerals as impurities which cause non-white colors. Frequently, clay having appropriate physical properties such as proper particle size and particle dimensions, and proper viscosity of clay-water suspensions, will be rejected as being unsuitable for paper coating because of having improper color, or insufficient brightness.

The clay that is used for coating paper is graded according to its brightness and opacity-creating ability. The brightness values referred to herein are determined in accordance with TAPPI tentative standard T646M-54, using a brightness meter.

Clay as mined from the ground in the United States consists of a multitude of particles of different sizes ranging from submicroscopic up. It has become convenient in recent years to refer to clay used for coating paper by identifying the percentage by weight of the particles coarser and finer than 2 microns (i.e., 2 microns equivalent spherical diameter). The majority of the coating grade clays have from 70–80% by weight of particles finer than 2 microns, and the best of these U.S. clays, when unbleached, have a brightness of about 84–85, and a bleached brightness of about 86–87. The coarse clays or filler grade clays contain between about 30 and 55% by weight of particles finer than 2 microns and have a lower brightness. The most expensive coating grade clays usually contain more than about 90% by weight of particles finer than 2 microns. Such clays, when unbleached, generally have a top brightness of about 85–86, and a brightness of about 87 when bleached.

The brightness of natural clays can normally be increased by various sizing processes hereinafter referred to as classification processes, since the finer clay particles give a greater brightness. However, the improvement produced by classification is insufficient to overcome the adverse coloring effects of highly colored clay, and is generally necessary to subject the refined clays to a supplemental treatment such as chemical bleaching. Generally, the bleaching by means of chemical reagents such as zinc or sodium hydrosulphite, results in an improvement of the clay brightness of the finished clays, but this improvement is normally not more than 2–5 points on the brightness meter. Moreover, it has been found that the use of significant quantities of chemical agents materially increase the viscosity of clay suspensions and pastes because of the high degree of solubility of the salts used. Necessarily, the use of chemical agents increases the cost of producing the final clay product. While there are other methods known for improving the brightness of clay, generally speaking they are quite expensive.

In producing coating grade clay for the paper industry, lumps of crude clay are taken from the mine and slurried by mixing the clay in a blunger along with water and a small amount of dispersant. The resulting slurries are then classified to yield the desired clay having the desired particle size distribution by such methods as hydroseparation, centrifugal forces or the like. These methods are well known to the prior art. Prior to the classification process, the clay slurries are treated with enough dispersing agent to achieve a low viscosity, close to minimum viscosity, or to achieve a maximum dispersion of clay particles in order to facilitate fractionation. These dispersing agents are well known in the clay field and among those which may be used are polyphosphates, carbonates, silicates, alkalis in general, mixtures thereof, basic salts, etc. The amounts used in the original clay slurry formation may vary from 0.5 pound per ton of dry clay to 8 pounds per ton of dry clay, the exact amount depending on the clay system itself and the type of dispersing agent used.

The normal amount of dispersant is usually considered to be the minimum dosage necessary to give a hard sediment when the clay-water slurry is classified. Typically this is very nearly equal to the amount of dispersant necessary to give the minimum viscosity. For example, usually 1 to 3 pounds sodium hexametaphosphate per ton of dry clay is sufficient for normal dispersion. After being dispersed, the clay slurry is subjected to a series of degritting steps during which coarse impurities such as sand and mica are removed. The degritting is usually accomplished by passing the slurry through drag classifiers, hydroclones, screens or the like. The degritted clay is then subjected to a classification step that separates the coating grades of clay (e.g. 70–95% by weight of particles finer than two microns) from the coarse residual non-coating grade clay (e.g. 19–26% by weight of particles finer than 2 microns). This classification process may be conducted in a settling tank, centrifuge, hydroseparator or the like. The crude clay also may be classified to give a finer fraction of classified clay (e.g. 80–90% by weight of particles finer than 2 microns) or a coarser fraction of classified clay (e.g. 67–70% by weight of particles finer than 2 mircons).

The coarse clay remaining after the coating grade clay is removed represents considerable waste due to an inadequate market. However, this coarse clay may be subjected to reclaiming steps so as to recover filler grade clay (e.g. containing 30–55% or more commonly 40–55% by weight of particles finer than 2 microns), thereby leaving as waste the clay fraction consisting of a coarse clay (e.g. containing 10–20% by weight of particles finer than two microns).

Generally, this coarse clay is discarded as unused waste, although in some instances some filler grade clay may be obtained from it. If desired, filler grade clay may also be prepared by mixing a coarse clay with finer clay particles. But in either event, there is an inadequate market for the filler grade clay and it is sold at prices well below the prices of coating grade clay. Generally, these conventional procedures recover from about 50 to 65% of the crude clay as coating grade clay, and about 10 to 15% as filler grade clay, leaving the remaining 20–40% as waste clay.

The above classification steps are normally performed with a clay-water slurry of about 20 to 35% solids. Several considerations influence the percent solids used for classification as practiced in the industry. With respect to classifying solids, U.S. Pat. 2,085,538 states:

"Thus freshly quarried clay and water may be mixed to form a clay suspension or slurry of a solids content ranging from, say, about 5% to 40%. In general suspensions falling at the lower end of such solids content range may be centrifugally fractionated by the method hereof with sharper definition of particle size between the solids fractions than can suspensions falling at the upper end of such solids content range . . ."

There, also, is a decided decrease in the percent recovery of unsedimented clay of a given particle size and a decrease in classifying rate as the classifying solids exceeds about 35%. On the other hand, excessive water present, when classifying solids are very low, must be removed in subsequent filtering steps, adding additional cost to the process. In consideration of these and other factors, classifying is usually practiced in the industry at about 20 to 35% solids.

Until recent years the remaining coarse fraction from the above conventional classifying methods, often as much as 35 to 40% of the crude clay, was discarded as waste. In recent years, methods have been discovered to fracture this coarse clay and produce a clay product having extremely high brightness values, a very white color, and desirable printing properties when used as paper coatings.

Several methods of fracturing this coarse fraction are available including the following:

(1) Kneading, plugging, etc. (e.g. Ko-Kneader). The coarse clay, in a plastic state (usually 70 to 90% by weight solids) is subjected to high intensity kneading under extreme pressures causing the coarse particles to be fractured as they rub against one another. Another variation of this method is the extrusion mill where the plastic mass is forced through small openings under high pressures. After fracturing, the clay is classified to obtain a fine fraction of desired particle size and having a very hard brightness and very white color.

(2) Soft media grinding (nylon, plastic, styrene, etc.). The coarse clay, in a dispersed clay-water slurry (usually about 30 to 55% solids), is mixed with soft media beads or pellets and the entire mass is intensely agitated. The coarse clay particles are fractured by mild shearing action, percussion of the media and clay particles and friction as the clay and media rub against one another. After fracturing, the clay is usually classified to obtain a product of the desired particle size.

(3) Hard media grinding (sand, fused silica, aluminum oxide, etc.). The coarse clay, in a dispersed clay-water slurry (usually 30 to 55% solids), is mixed with the hard grinding media and intensely agitated. The coarse clay particles are fractured much in the same way as with soft media grinding except that the fracturing is much more intense using hard media. After fracturing, the clay is usually classified to obtain a product of the desired particle size.

Each of the above methods has both advantages and limitations.

High intensity kneading is limited and has a disadvantage in that the percent solids content of the clay must be raised following kneading and classification, and prior to the next pass through the kneader.

Soft media grinding rates are very slow and inefficient when compared to hard media grinding.

Hard media grinding is probably the most efficient of the three in terms of particle breakage, however, an inferior product is produced unless a major portion of the titanium mineral impurities contained in the feed material are removed prior to grinding. This is explained in the following manner: When coarse clay fractions are fractured by high intensity kneading or soft media grinding, the particles of titanium mineral impurities contained in the clay are not materially affected as to size. Hence, when the fractured clay is classified, the titanium mineral particles and coarse clay particles settle to the bottom leaving the fractured clay particles suspended in the fine portion. This occurs because the titanium mineral particles remain the same size and retain the same settling rate while the majority of the coarse clay particles are fractured into many smaller particles having a much slower settling rate. The smaller percentage of titanium mineral impurities remaining in the freshly fractured fines when a fractured clay is classified account for a portion of the increased brightness and white color. When coarse clay fractions are fractured by hard media grinding the titanium mineral particles are also fractured and a considerable portion of these impurities remain in the fine fraction when the clay is classified and discolor the product. The above statements have been substantiated by microscope observation of the impurities collected from classification of clays fractured by the three methods. To illustrate the above, two portions of the same coarse clay fraction containing about 10% by weight of particles finer than 2 microns were fractured, one with hard media (sand) and the other with soft media (nylon), to about 30 to 40% by weight of particles finer than 2 microns and classified to obtain a product of about 76 to 77% by weight of particles finer than 2 microns. The fine fraction (77%—$2\mu$) fractured with sand had a G.E. brightness of 83.4 and a titanium content of 1.14% (measured as $TiO_2$), while the fine fraction (76.5%—$2\mu$) fractured with nylon had a G.E. brightness of 87.4 and a titanium content of 0.58% (measured as $TiO_2$). Neither of these samples was bleached.

Due to the high efficiency of hard media grinding, it would be desirable to use this method of fracturing coarse clays either as the primary method or as a supplement to other methods if the titanium minerals can be removed prior to fracturing. The desirability of titanium mineral removal has long been recognized. The prior art has proposed several methods for the removal of titanium mineral impurities from clay fractions, but in all cases, the methods proposed appeared to be expensive for one reason or another. For instance, U.S. Pat. No. 2,920,832 teaches the removal of titanium impurities by selective froth flotation. U.S. Pat. No. 3,371,988 teaches a method of beneficiating kaolin clay by the use of excess amounts of peptizing agents. These methods have been tested and appear to be successful, however, the cost of flotation chemicals or peptizing chemicals, along with the cost of excessive washing necessary to remove the additional chemicals increases the overall expense of the process.

It has now been discovered that unexpectedly large amounts of titanium minerals can be removed from both crude clay and from fractions of classified clay through the use of a modified sedimentation technique. It has been found that the titanium mineral removal method of this invention is particularly useful for lowering the titanium content of relatively coarse residue from a process of classifying clay. Basically, this invention contemplates sedimenting a clay-water suspension of a relatively high clay solids, and recovering an unsedimented clay having a greatly reduced titanium mineral content.

More specifically, it has been found the titanium mineral level of clay can be appreciably lowered by forming a clay in water dispersion using the amount of dispersant normally used in classification, by maintaining the clay solids content above the limits normally practiced in the industry, and allowing the suspension to sediment. The titanium is concentrated in the settlings and reduced in the recovered portion of the clay remaining in suspension. This process is particularly effective in that the titanium content of the coarser clay fractions can be reduced to levels which permit fracturing by hard media grinding to yield a much brighter, whiter clay product. At the same time, the method of this invention, using a clay dispersion having normal amount of dispersant, at above normal solids content for sedimentation, can reduce the titanium mineral content without raising costs for additional chemicals or the removal of excess water. This aspect is completely unexpected and surprising.

When coarse clay is treated in accordance with our invention, and then fractured, the resulting fractured clay has greater brightness than fractured particles of clay of substantially the same size from the same crude clay which had not been so treated.

By using the process of this invention, a coarse clay, from which the titanium mineral impurities have been removed, may be admixed with water and deflocculating agent and fractured in a pug mill of the type shown in U.S. Millman et al. Pat. 2,535,647 or a Rafton mill such as shown in U.S. Rafton Pat. 2,448,049. When a pug mill is used, the charge should contain about 70-90% by weight solids. We prefer to use a charge of about 60-65% by weight solids in the Rafton mill.

As a result of such a fracturing operation, the proportion of clay particles finer than 2 microns may be substantially increased. The resulting clay product may then be classified to provide for the recovery of clay having a still higher weight percent of particles finer than 2 microns and higher brightness. The resulting clay product generally will have greater brightness than clay of substantially the same size that is produced from classifying crude clay, and the recovery of clay finer than 2 microns is greater. The remaining relatively coarse clay may be recycled for repeated titanium impurity removal or for repeated fracturing operations. This process may be used to provide a recovered clay which constitutes classified mill-fractured remnants of naturally occurring larger clay particles having a reduced titanium mineral content.

As indicated above, gravitational force may be used to cause separation of clay fractions present in a deflocculated clay suspension, the finer clay particles being separated from the larger clay particles. According to Stokes law, the settling rate of clay particles with the same specific gravity varies as the square of the diameter (equivalent spherical diameter), so that the relatively large particles should be easily separated from the fine particles. Any impurity present in or with a clay that is of such a size as to settle at the same rate as a given clay particle, will not separate by gravitational settling from that particle, but will remain with it. When clay is classified, for example, in an aqueous deflocculated suspension, whatever impurities are present with the same settling rate as a given size clay fraction will remain with that fraction. The success of the present invention seems to be explained by the theory that titanium minerals can be removed from a clay in water suspension if the settling rate of the desired clay particles is different from the settling rate of the titanium mineral impurities and that the settling rate may be varied by adjusting the solids content of the clay in water suspension.

Since the titanium minerals have a higher specific gravity than clay, it was originally thought that more efficient titanium removal could be effected by diluting the dispersions which are to be subjected to classification. It was believed that conventional solids levels of around 20 or 25% by weight were necessary to minimize crowding or interference of the particles during the sedimentation step. This is usually carried out in the presence of a conventional amount of dispersant, which normally would be the dosage necessary to give a hard sediment bottom.

Contrary to conventional practices, it has been found that raising the percentage of solids at which a coarse clay fraction is classified to higher than that normally used, results in a decrease in the titanium mineral content in the unsedimented clay. It is postulated that this occurs because the settling rate of the higher specific gravity titanium minerals (specific gravity about 4.0) is not reduced as much as that of the clay particles (specific gravity about 2.63) by "crowding" in the higher solids clay slurry. The rate at which titanium minerals settle out of a high solids slurry appears to be less, but the percent of titanium minerals left in suspension is less since more clay remains in suspension.

The present invention may be applied to clay in various stages of refinement, and the optimum conditions will vary depending upon the status of the clay treated. When the process of this invention is applied to unrefined crude clay, the solids of the dispersion should be higher than 40% by weight and preferably between 45 and 55% by weight; although higher solids may be used. When the process of this invention is applied to a coarse unfractured clay (such as a crude clay from which coating grade clay or coating grade and filler grade clay has been removed by conventional procedures) the solids content should be over 35% by weight and preferably in the range of 45 to 60%, but may run higher than 60% by weight. When the process of this invention is applied to a coarse residue of a fracturing process, desirably low titanium dioxide values can be achieved using as little as 30% by weight solids. However, better results are obtained using from about 40 to 55% by weight solids.

It has also been found, particularly when dealing with fractured clay, that the relative quantity of clay settled as compared to the unsedimented or recovered quantity is very important. Not only does the recovery percentage affect the time of the process or production capacity of the equipment used, but it also affects the titanium mineral content of the recovered clay. For instance, it has been found that when operating with a coarse, unfractured clay at 58% solids, a significant reduction in titanium minerals can be achieved at a recovery of about 60% (see Example 1). However, when the process of this invention is applied to a coarse fractured clay at about 34% solids, it is necessary to carry the sedimentation further in order to get titanium removal of the same magnitude. It has been found that under these conditions a recovery in the order of 15 to 20% by weight will produce the desired results.

Generally speaking, clay in water slurries of from about 40% to about 60% solids may be used, but best results have been obtained using slurries of from about 45 to 55% by weight solids. There may be an upper limit to this phenomenon where excessive crowding prevents the titanium from settling out. An upper limit of between 55 and 65% solids has been observed on some samples, but this probably varies with different clays, clay particle size distributions, and impurity contents.

The following examples will serve to illustrate the removal of titanium impurities from kaolinitic type clays but it is understood that these examples are set forth merely for illustrative purposes, and that many other processes may be employed within the scope of the present invention. All percentages used in the following examples refer to percent by weight, unless expressly stated otherwise. In these examples and throughout this patent application the percent solids used is calculated at the beginning of the sedimentation procedure. All titanium mineral analysis report the titanium level as percent by weight of titanium dioxide.

EXAMPLE 1

The coarse clay remaining after removal of a coating grade clay and filler grade clay by conventional classification from a kaolin clay from Washington County, Ga., was used as the starting material. This clay had a titanium impurity content of 1.0%. This coarse clay was dispersed with ¾ pound per ton sodium hexametaphosphate and ¼ pound per ton sodium carbonate (the minimum amount necessary to give a hard sediment) and mixed 5 minutes in a Waring Blendor at 58% solids. Portions were diluted to 47.6%, 31.2%, 25.3%, and 15.8% solids and settled varying times at a depth of 3.75 inches. After settling desired time, the suspended clays were poured off, filtered, dried, and tested. Results are shown in Table I.

TABLE I

| | Unsedimented clay | |
|---|---|---|
| | Percent recovered | Percent $TiO_2$ |
| Percent solids: | | |
| Start | | 1.00 |
| 15.8 | 19.3 | 1.23 |
| 15.8 | 41.0 | 1.13 |
| 15.8 | 55.2 | 1.10 |
| 15.8 | 70.3 | 1.26 |
| 25.3 | 14.1 | 1.17 |
| 25.3 | 24.5 | 1.08 |
| 25.3 | 39.5 | 1.03 |
| 25.3 | 62.0 | 1.03 |
| 25.3 | 77.0 | 1.00 |
| 31.2 | 15.6 | 1.08 |
| 31.2 | 26.5 | 0.96 |
| 31.2 | 40.0 | 0.97 |
| 31.2 | 52.3 | 0.93 |
| 31.2 | 73.6 | 0.98 |
| 47.6 | 7.4 | 0.79 |
| 47.6 | 22.6 | 0.53 |
| 47.6 | 40.3 | 0.53 |
| 47.6 | 55.6 | 0.60 |
| 47.6 | 67.9 | 0.67 |
| 58.0 | 27.3 | 0.46 |
| 58.0 | 45.0 | 0.53 |
| 58.0 | 59.5 | 0.63 |

Table I above shows that unsedimented clay fractions of considerably lower titanium content were obtained at high solids levels than were possible at conventional solids levels.

EXAMPLE 2

The clay for this experiment was a coarse kaolinitic clay fraction remaining after conventional classification to remove coating grade clay and further classification to remove filler grade clay. This coarse fraction was dispersed at 49.0% solids using a mixture of ½ pound sodium hexametaphosphate and ¼ pound of sodium carbonate per ton of clay (the minimum amount of dispersing agent to get a hard sediment). This dispersion was mixed for 5 minutes in a Waring Blendor running at low speed. The mixture was divided into 5 examples, which were diluted to the percentage of solids shown in Table II and the dispersions were allowed to settle 12.6 minutes per inch. The suspended fractions were poured off and analyzed. The results of the analysis is shown in Table II.

TABLE II

| | Unsedimented clay | |
|---|---|---|
| Classifying percent solids | Percent recovery | Percent $TiO_2$ |
| Starting material | 100.0 | 1.00 |
| 49.0 | 42.1 | 0.51 |
| 44.4 | 36.4 | 0.56 |
| 40.8 | 29.3 | 0.62 |
| 31.2 | 28.0 | 0.96 |
| 22.5 | 14.7 | 1.25 |

EXAMPLE 3

Four more clay dispersion samples were prepared as described in Example 2, diluted to the solids percentages shown in Table III, and allowed to settle for various times in order to obtain approximately the same percentage of recovery of unsedimented clay. The recovered fines were analyzed, and the analysis is shown in Table III.

TABLE III

| | Unsedimented clay | |
|---|---|---|
| | Percent recovery | Percent $TiO_2$ |
| Classifying solids: | | |
| 46.5 | 39.5 | 0.52 |
| 34.5 | 39.4 | 0.77 |
| 46.5 | 18.0 | 0.56 |
| 34.5 | 21.4 | 0.77 |

Examples 4–6 illustrate the removal of titanium minerals from coarse clay fraction remaining after fracturing by high intensity kneading.

EXAMPLE 4

A crude kaolin clay was classified in the conventional manner to remove a coating grade clay and a filler grade clay. The remaining coarse clay was fractured by high intensity kneading in a KO-Kneader and a fractured coating grade clay product removed by conventional classification.

The remaining coarse clay with a titanium content of 1.50% (measured as $TiO_2$), was used as starting material for this example. No additional dispersing chemical above that previously added for normal classification was necessary to give a hard sediment. The clay was mixed 5 minutes in Waring Blendor at 46.8% solids. Portions were diluted to 33.9%, 18.0%, and 14.2% solids and settled varying times at 3.75 inches depth. After settling desired times, at 75° F., the unsedimented clay was poured off, filtered, dried and tested. Test results are given in Table IV below:

TABLE IV

| | Unsedimented clay | |
|---|---|---|
| | Percent recovered | Percent $TiO_2$ |
| Classifying solids: | | |
| Start | | 1.50 |
| 14.2 | 23.0 | 0.98 |
| 14.2 | 46.0 | 1.18 |
| 14.2 | 58.5 | 1.27 |
| 14.2 | 71.8 | 1.34 |
| 18.0 | 21.3 | 0.83 |
| 18.0 | 31.0 | 0.98 |
| 18.0 | 39.5 | 1.05 |
| 18.0 | 51.0 | 1.18 |
| 18.0 | 70.8 | 1.30 |
| 33.9 | 12.3 | 0.41 |
| 33.9 | 26.9 | 0.40 |
| 33.9 | 32.5 | 0.49 |
| 33.9 | 55.3 | 0.85 |
| 33.9 | 70.4 | 1.14 |
| 46.8 | 14.3 | 0.29 |
| 46.8 | 34.9 | 0.32 |
| 46.8 | 48.2 | 0.44 |
| 46.8 | 59.6 | 0.57 |
| 46.8 | 75.0 | 0.91 |

The results of Example 4 show that for a fractured clay, the percent recovery of fines is increased considerably for a given titanium mineral content product as the percent solids is increased. Example 4 illustrates that dispersions of fractured clay of less than 35% solids can be sedimented to yield an unsedimented clay containing low amounts of $TiO_2$, if the sedimentation is sufficiently complete, but the corresponding recovery is quite low.

EXAMPLE 5

The starting material for this example was the residual coarse fraction recovered after the removal of a fractured clay similar to that used in Example 4. The coarse clay had a titanium impurity content of 1.43% (measured as $TiO_2$). As received, the starting material contained 1.25 pounds per ton of sodium hexametaphosphate and 0.5 pound per ton of sodium carbonate as dispersing agents. An additional 0.5 pound per ton of sodium hexametaphosphate was added in order to achieve a hard sediment bottom. Three samples were prepared at each of 15, 25, 35, and 40% by weight solids. At each solids level, samples were settled for various times in order to recover approximately 20, 50, and 80% by weight of the clay as an unsedimented portion. The results of the sedimentation process are shown below in Table 5.

TABLE V

| Solids: | Unsedimented clay ||| Settling time, min. |
|---|---|---|---|---|
| | Percent recovery | Percent TiO$_2$ | Percent 2u | |
| Start | | 1.43 | 4.5 | 0 |
| 44.9 | 78.2 | 1.12 | 6.5 | 15.0 |
| 44.9 | 47.6 | 0.65 | 9.0 | 62.0 |
| 44.9 | 19.8 | 0.45 | 21.0 | 146.0 |
| 35.0 | 78.1 | 1.23 | 6.5 | 10.0 |
| 35.0 | 53.0 | 1.01 | 9.0 | 30.0 |
| 35.0 | 18.8 | 0.61 | 20.0 | 98.0 |
| 25.0 | 78.3 | 1.29 | 6.0 | 7.0 |
| 25.6 | 49.3 | 1.17 | 9.0 | 22.0 |
| 25.0 | 21.4 | 1.01 | 20.0 | 60.0 |
| 15.0 | 80.8 | 1.34 | 6.0 | 3.75 |
| 14.8 | 51.9 | 1.30 | 8.0 | 15.0 |
| 15.0 | 18.7 | 1.20 | 23.0 | 46.0 |

The data shown in Table 5 illustrates the feasibility of reducing the titanium impurity content of a fractured clay residue by operating at solids levels even lower than 35% by weight. Generally, it is believed, based on this and the data found in the other examples, that the lower realistic limit of the solids is about 30% by weight. While somewhat lower or higher solids levels may be used, depending upon the clay, dispersants and the like, the high solids sedimentation process, using more than about 40% by weight is preferred since the titanium impurities are removed more quickly.

It will be observed from the data presented in Table 5 that the solids level of the dispersion does not affect materially the classification achieved by the sedimentation process. In this example, the starting material contained 4.5% by weight of particles finer than about 2 microns. When the samples were sedimented to recover about 20% of clay, the unsedimented clay contained about 20% by weight of particles finer than 2 microns, irrespective of the initial solids content of the suspension. It will be noticed that the settling time to achieve this classification is much greater using the high solids, and it is for this reason that the prior art has generally advocated the use of low solids suspensions to classify clay.

EXAMPLE 6

The starting material for this example was a coarse fractured clay obtained in the same manner as described in Example 4. This starting coarse clay contained 8.0% by weight of particles finer than 2 microns and 1.48% TiO$_2$.

The clay was mixed 5 minutes, with no additional dispersing chemical, at 47.0% solids.

One portion was settled at 47.0% solids to recover 67% of the clay as a finer fraction containing 0.50% TiO$_2$ and 12.0% by weight of particles finer than 2 microns.

A second portion was diluted to 20.0% solids and settled to recover 69% of the clay as a finer fraction of about the same particle size. This finer fraction had a TiO$_2$ content of 1.39% and contained 11.5% by weight of particles finer than 2 microns.

Both finer fractions were bleached with 4 pounds per ton sodium hydrosulphite and sulfuric acid at 2.5 pH, filtered and oven dried at 180° F.

The finer fraction settled at 47% solids (0.50% TiO$_2$ content) had a G.E. brightness of 84.0; while the finer fraction settled at 20% solids, with about the same particle size (1.39% TiO$_2$ content) had a G.E. brightness of 78.0.

Examples 7 to 9 were run to show the effect of various types and amounts of dispersing agents on the sedimentation process of this invention. As a result of the data generated, it was concluded that the addition of dispersing agents beyond the normal amount does not materially improve the speed or completeness of titanium impurity removal, and indeed, in some cases hinders the removal.

EXAMPLE 7

A sample of coarse clay was obtained which was the residue of the commercial manufacture of coating grade clay and filler grade clay. The coarse material containing about 25% by weight moisture and about 10 percent of particles finer than 2 microns, was fed into the Ko-Kneader. After fracturing in the Ko-Kneader, this material had approximately 34 percent by weight of the particles finer than 2 microns. The fine fraction (coating grade clay) was removed by classification. The residue coarse clay fraction contained 8% by weight of particles finer than 2 microns and had a titanium impurity content of 1.38 percent (determined as TiO$_2$).

The resulting coarse clay was divided into fractions which were made up into dispersions. The varying amounts of tetrasodium pyrophosphate, as shown in Table 6, were added to the dispersions. The dispersions were allowed to settle. The results in terms of the recovery of unsedimented clay and the resulting titanium content are shown.

TABLE VI

| Classification solids | Dispersion lb./ton, TSPP added | Unsedimented clay ||
|---|---|---|---|
| | | Percent rec. | Percent TiO$_2$ |
| Starting material | | 100.0 | 1.38 |
| 36.2 | 0 | 45.6 | 0.64 |
| 36.2 | 1 | 45.5 | 0.50 |
| 36.2 | 2 | 45.8 | 0.48 |
| 24.8 | 1 | 33.6 | 0.73 |
| 24.8 | 2 | 33.6 | 0.71 |
| 24.8 | 2 | 38.0 | 0.83 |
| 24.8 | 2 | 45.7 | 0.93 |
| 24.8 | 4 | 33.5 | 0.69 |

The results of Example 7 show that there is an increase in the percentage of unsedimented clay recovered and a decrease in the titanium content of the recovered clay as the classification solids increased. It was previously thought that the use of lower than normal classifying solids would aid in removal of titanium impurities, since the specific gravity of the titanium impurity is about 4.0 as compared to 2.63 for clay.

EXAMPLE 8

A coarse fractured clay residue was obtained in the same manner as described in Example 7. This coarse clay had a titanium impurity content of 1.38%. The clay was mixed 5 minutes in a Waring Blendor at 44.7% solids and divided into 10 samples. Dispersing chemicals of the type and amount shown in Table VII were added to the samples. All samples contained 44.7% solids and were settled for a period of 70 minutes and the unsedimented clay was poured off and tested.

TABLE VII

| Lb./ton additional chemical added ||| | Unsedimented clay ||
|---|---|---|---|---|---|
| A | B | C | pH | Percent recovery | Percent TiO$_2$ |
| Start | | | | | 1.38 |
| 0 | 0 | 0 | 7.3 | 51.2 | 0.49 |
| 1 | | | 8.0 | 51.6 | 0.49 |
| 2 | | | 8.6 | 51.8 | 0.48 |
| 4 | | | 9.1 | 52.8 | 0.47 |
| | 1 | | 8.6 | 51.2 | 0.47 |
| | 2 | | 9.1 | 51.6 | 0.48 |
| | 4 | | 9.5 | 53.1 | 0.51 |
| | | 1 | 8.0 | 53.3 | 0.48 |
| | | 2 | 8.4 | 55.5 | 0.56 |
| | | 4 | 8.7 | 56.8 | 0.57 |

Note:
A, type "N" sodium silicate.
B, a mixture of equal prts of sodiumhexametaphosphate and sodium carbonate.
C, tetrasodium pyrophosphate.

The results shown in Table VII indicate that neither the type nor the quantity of dispersing agent (above the normally used quantity) have any profound effects on the extent titanium removal. Likewise, no correlation with pH was observed.

EXAMPLE 9

This test was conducted to determine if a large overdosage of dispersing chemical (enough to partially flocculate the clay-water slurry) would aid in removal of titanium impurities at high solids. The coarse clay used was the coarse remaining after removal of coating and filler grades, pugging of remaining coarse and removal of fractured product containing 70% by weight of particles finer than 2 microns, and high solids separation of remaining coarse to recover useable fines at 0.5% $TiO_2$ level. This coarse starting material had a 2.56% $TiO_2$ content. Portion A was blunged 15 minutes with no additional dispersing chemical. Additional dispersing chemical (20#/ton of sodium hexametaphosphate) was added to portion B and mixed 15 minutes. Both samples containing 46.8% solids were settled to the times shown in Table VIII, and the unsedimented clay poured off and tested. Test results are shown in Table VIII.

TABLE VIII

| | Unsedimented clay | | |
|---|---|---|---|
| | Min./inch | Percent recovered | Percent $TiO_2$ |
| Portion: | | | |
| A | 14.3 | 32.8 | .88 |
| A | 20.0 | 20.5 | .52 |
| A | 24.3 | 12.7 | .39 |
| B | 14.3 | 29.8 | 1.15 |
| B | 20.0 | 17.7 | .77 |
| B | 24.3 | 15.0 | .58 |
| B | 40.0 | 7.4 | .40 |

The results of Example 9 show that large overdosage of dispersing chemical actually hindered titanium minerals removal in this test.

Examples 7, 8 and 9 indicate that no additional dispersing chemical above the minimum amount necessary to give a hard sediment is needed to concentrate and remove titanium impurities by high solids separation from coarse clays.

The present invention also contemplates the production of a very white, high brightness fractured clay product using hard media grinding to fracture the clay particles after the removal of the titanium minerals to an acceptable level. Previous attempts to produce such a product, without first removing these impurities, have been unsuccessful because the hard media fractured the titanium minerals as well as the clay particles and the resulting finely ground titanium minerals remained in the suspension when the fractured clay was classified. Hard media (sand, fused silica, aluminum oxide, etc.) grinding is more efficient and economical when used in secondary fracturing for recovering additional fractured clay product. After the initial fracturing by fracturing processes other than hard media grinding, there is a loss in efficiency of repeated passes through pug mills, kneaders, soft media (nylon, styrene, etc.) mills, and etc. Hard media grinding overcomes this loss of efficiency. This invention also contemplates the use of hard media grinding as the primary method of fracturing to obtain a very white, high brightness fractured clay product. After the removal of titanium minerals to an acceptable level, a fractured clay product can be produced by one-stage grinding to the desired particle size, successive grinding and classifying stages, or grinding with continuous removal of fines of the desired particle size. Examples 10–13 illustrate the production of such a product.

EXAMPLE 10

This example illustrates the use of hard media one-stage grinding to accomplish secondary fracturing, after removal of titanium minerals, to produce a high brightness fractured clay product. The starting material was the coarse clay residue from conventional classification of a crude clay to remove coating and filler grades of clay, kneading of the remaining coarse and classification to remove the fine fractured clay product. The coarse clay residue contained 1.5% by weight $TiO_2$ and 8.0% by weight of particles finer than 2 microns. The clay was diluted to 47.0% solids (no additional dispersing chemical was necessary) and allowed to settle to recover 55% of the clay as a fine fraction with a 0.50% $TiO_2$ content. This unsedimented material contained 12% by weight of particles finer than 2 microns.

A "single cycle" fractured product was produced by grinding a portion of this material until it contained 66% by weight of particles finer than 2 microns in a Red Devil paint shaker in glass jars using 16 to 30 mesh Ottawa sand as grinding media. After grinding, the product was bleached with 4 pounds per ton sodium hydrosulphite and sulphuric acid at 2.5 pH, filtered, and oven dried at 180° F. Coating formulations, as shown below, were prepared using the product of this example and a conventional No. 2 coating grade clay for comparison using the following ingredients:

| | Parts |
|---|---|
| Clay | 100 |
| Starch | 16 |
| Calcium stearate | 0.6 |
| Tetrasodium pyrophosphate | 0.2 |
| $H_2O$ for desired percent solids. | |

These coating formulations were coated on 28 pound base stock paper using Bird applicators to give about 8.5 and 4.5 pounds per ream coat weights. After conditioning, the coated sheets were supercalendered 3 nips at 1100 p.l.i. at 170° F. and tested as shown in Table IX.

TABLE IX

| | Example 10 product | | Conventional No. 2 coating grade clay | |
|---|---|---|---|---|
| Clay tests, G.E. brightness | 89.3 | | 86.0 | |
| Particle size: | | | | |
| $-2\mu$ | 66.0 | | 80.0 | |
| $+10\mu$ | 0.0 | | 0.0 | |
| Coated sheet tests: | | | | |
| Coating weight | 8.7 | 4.5 | 8.2 | 4.3 |
| Gloss | 72.0 | 63.5 | 59.0 | 48.5 |
| G.E. brightness | 71.8 | 69.4 | 69.6 | 67.9 |
| Opacity | 92.8 | 91.0 | 92.3 | 89.6 |
| Dennison wax | 4A | 5A | 5A | 5A |
| K and N ink | 63.8 | 62.0 | 64.6 | 64.3 |

EXAMPLE 11

This example illustrates successive grinding and classification steps to produce a high brightness fractured clay product after the removal of titanium impurities by high solids separation. The starting coarse clay fraction used in Example 10 was used in this example. The coarse clay fraction was settled at 47.0% solids to recover 55% of the clay as a fine fraction containing 0.50% titanium mineral (reported as $TiO_2$) and 12% by weight of particles finer than 2 microns.

Portions of this material (0.50% $TiO_2$ content) were fractured in glass jars in a Red Devil paint shaker using 16 to 30 mesh Ottawa sand as grinding media until the clay contained about 40% by weight of particles finer than 2 microns. After fracturing, the clay was diluted to 32% solids and classified to obtain a fine fraction of 65 to 67% by weight of particles finer than 2 microns. The coarse fraction from the classification was then mixed back, in a percentage equal to the fine fraction which was removed, with the unfractured feed (0.50% $TiO_2$ content) and again fractured as above to contain about 40% by weight of particles finer than 2 microns. Again the clay was diluted to 32% solids, classified to remove a fractured clay product containing 65 to 67% by weight of particles finer than 2 microns. This procedure was repeated four times and the product of the fourth cycle, after classifying to recover a fraction containing 67% by weight of particles finer than 2 microns, was bleached with 4 pounds per ton sodium hydrosulphite and sulphuric acid at 2.5 pH, filtered and oven dried at 180° F. After testing the clay, coated sheets of this fourth cycle product and a conventional No. 2 coating grade clay were prepared and tested using the same formulation and procedure used in Example 10. Test results are shown in Table X.

TABLE X

|  | Example 12 product | | Conventional grade clay | |
| --- | --- | --- | --- | --- |
| Clay tests, G.E. brightness | 89.2 | | 86.0 | |
| Particle size: | | | | |
| −2μ | 67.0 | | 80.0 | |
| +10μ | 0.0 | | 0.0 | |
| Coated sheet tests: | | | | |
| Coating weight | 8.8 | 4.6 | 8.2 | 4.3 |
| Gloss | 69.5 | 60.0 | 59.0 | 48.5 |
| G.E. brightness | 71.0 | 68.8 | 69.6 | 67.9 |
| Opacity | 92.7 | 90.5 | 92.3 | 89.6 |
| Dennison wax | 4A | 4A | 5A | 5A |
| K and N ink | 63.0 | 58.6 | 64.6 | 64.3 |

EXAMPLE 12

This example illustrates the difference in fractured clay products made with a production type grinding mill using high solids separation to remove titanium impurities prior to fracturing versus fracturing the coarse without removing the impurities. Both samples were fractured in a Sweco VE–D–10 mill. The Sweco VE–D–10 mill operates on a similar principle as other sand grinding mills. It consists of a large container which vibrates at high freqeuncy and, also, has an agitator to agitate the mixture of clay to be fractured and the grinding media. Grinding media used for this example was 16 to 30 mesh Ottawa sand. The mill can be operated continuous or batch type operation. These tests were conducted using the batch basis.

The coarse clay fraction used for this example was that coarse remaining after removal of coating and filler grades of clay, kneading of the remaining coarse and classification to remove the fractured clay product containing 70% by weight of particles finer than 2 microns. This coarse starting material contained 1.46% of titanium impurity and 8.0% by weight of particles finer than 2 microns.

A portion of this starting material (1.46% $TiO_2$ content) was fractured in the Sweco VE–D–10 to give 25% by weight particles finer than 2 microns and classified to obtain a fractured product containing 65% by weight of particles finer than 2 microns and 1.40% $TiO_2$. The product was bleached with 4 pounds per ton sodium hydrosulphite and sulfuric acid at 2.5 pH, filtered and oven dried at 180° F. This product is shown as Product A in Table XI.

A second portion of the starting material (1.46% $TiO_2$ content) was settled at 48% solids (no additional dispersing chemical used) to recover 55% of the clay containing 0.52% titanium impurity and 11.5% by weight of particles finer than 2 microns. This material (52% $TiO_2$ content) was fractured in the Sweco VE–D–10 mill to give 24.5% by weight of particles finer than 2 microns and classified to obtain a fractured product with 68.0% by weight of particles finer than 2 microns and a (55% $TiO_2$ content). The product was bleached with 4 pounds per ton sodium hydrosulphite and sulphuric acid at 2.5 pH, filtered, and oven dried at 180° F. This product is shown as Product B in Table XI.

After testing the clay, coated sheets of both Product A and Product B and a No. 2 conventional coating clay were prepared and tested using the same formulation and procedure used in Example 10.

TABLE XI

|  | Product A | | Product B | | Conventional No. 2 coating grade clay | |
| --- | --- | --- | --- | --- | --- | --- |
| Clay test, G.E. brightness | 82.0 | | 87.9 | | 86.0 | |
| Particle size: | | | | | | |
| −2μ | 65.0 | | 68.0 | | 80.0 | |
| +10μ | 0.0 | | 0.0 | | 0.0 | |
| Coated sheet tests: | | | | | | |
| Coating weight | 8.8 | 4.6 | 8.5 | 4.7 | 8.2 | 4.3 |
| Gloss | 69.0 | 60.5 | 70.5 | 61.0 | 59.0 | 48.5 |
| G.E. brightness | 69.7 | 68.4 | 71.8 | 69.4 | 69.6 | 67.9 |
| Opacity | 93.0 | 90.7 | 92.7 | 91.0 | 92.3 | 89.6 |
| Dennison wax | 4A | 4A | 4A | 4A | 5A | 5A |
| K and N ink | 55.3 | 57.5 | 56.8 | 56.9 | 64.6 | 64.3 |

EXAMPLE 13

A coarse clay residue from the commercial production of coating grade clay, wherein a fraction containing 80 percent of particles finer than 2 microns was removed, followed by the further removal of filler grade clay containing about 50 percent of the particles finer than 2 microns. The coarse residue contained about 10 percent by weight of particles finer than 2 microns. This coarse fraction was fractured in the Ko-Kneader to give about 34 percent by weight of particles finer than 2 microns. The fractured clay was then classified to recover 42.8 percent as a coating grade clay containing 71 percent by weight of the particles finer than 2 microns. This fine fraction recovered had a G.E. brightness of 89.5 after bleaching and a titanium content of about 0.38 percent ($TiO_2$). The coarse fraction remaining after this classification contained about 8 percent by weight of particles finer than 2 microns and had an unbleached G.E. brightness of 76.5. The titanium content (measured as $TiO_2$) of the residual coarse fraction was about 1.38 percent.

This coarse fraction was dispersed in water at 47.2 percent solids using ¾ pound of sodium hexametaphosphate and ¼ pound of sodium carbonate per ton of clay (the minimum amount to get a hard sediment). The sedimented clay was discarded to yield 55 percent by weight of the clay recovered as the unsedimented portion with a $TiO_2$ content of 0.51 percent. Tests indicated the recovered fraction contained about 11.5 percent of the particles finer than 2 microns and had a bleached G.E. brightness of 84.0. The unsedimented dispersion contained 36.4 percent solids after the sedimentation process.

A portion of the 36.4 percent solids dispersion was flocculated with a portion of sulfuric acid. This flocculated material was then filtered to give a 65 percent solids material, and then diluted to 45 percent solids with an unfiltered, unflocked portion. About 0.15 percent of tetrasodium pyrophosphate was added to this dispersion.

Four hundred milliliters of the above-described 45 percent solids slurry was placed in a one-quart glass jar along with 900 grams of 20–30 mesh Ottawa sand as grinding media. The jar was placed in a Red Devil paint shaker and the clay was ground for 5 hours. After grinding, the clay was diluted to about 25 percent solids and bleached with 4 pounds per ton of sodium hydrosulphite and sulfuric acid at 2.8 pH. A sample was filtered and oven-dried at 180°. After drying, the sample contained 73 percent by weight of particles finer than 2 microns and had a bleached G.E. brightness of 89.0 and a very white color characteristic of fractured clay.

The present invention further contemplates the use of the method of concentrating and removing titanium impurities by separation and classification at high solids with crude clay. Although results are not as pronounced as with coarser clay fractions, the removal of titanium impurities from crude clay can be accomplished. Examples 14 and 15 illustrate use of the method on crude clays.

EXAMPLE 14

A sample of crude Georgia kaolin clay was split into two portions. The first portion was classified in the normal manner, using a conventional low solids dispersion. The second portion was classified using a high solids dispersion technique of this invention.

The crude kaolin was dispersed by using a mixture of 1.25 pounds of sodium hexametaphosphate and 0.5 pound of sodium carbonate per ton of clay, which was the minimum amount of dispersing agent to give a hard sediment. The clay-dispersing agent mixture at 45% solids was placed in a Waring Blendor and run for 5 minutes. One portion of the resulting dispersion was diluted to 27.5% solids for classifying, and the other was classified at 45% solids. Both were classified to recover about the same percentage of clay as a fine fraction containing between 81 and 84% by weight of particles finer than 2 microns. After settling, both portions were bleached with 4 pounds of hydrosulphite per ton of clay, and sufficient sulfuric acid to give 2.5 pH. The bleached clays were filtered, and oven dried at 180° F.

The portion classified in the normal manner (27.5% solids) contained 84.0% by weight of particles finer than 2 microns, a bleached G.E. brightness of 86.6 and a titanium content of 1.90% (as $TiO_2$). The portion classified in accordance with this invention at high solids (45% solids) contained by weight 81.0% of particles finer than 2 microns, with a bleached G.E. brightness of 86.9 and a titanium content of 1.80% (as $TiO_2$).

EXAMPLE 15

The same crude clay as was used in Example 14 was pugged 20 minutes in a closed, lab model Read mill and dispersed in the manner described in Example 14 using the same amount of dispersing agent.

One portion was classified at 40.5% solids and a second portion diluted to 23% solids for classification. Both samples were sedimented to recover approximately the same percentage and were bleached with 4 pounds per ton sodium hydrosulphite and sulfuric acid to give 2.5 pH, filtered and oven dried at 180° F.

The portion which was classified at 23.0% solids contained 86.5% by weight of particles finer than 2 microns, and had unbleached G.E. brightness of 85.1, a bleached G.E. brightness of 87.3, and a titanium content of 1.79% (as $TiO_2$).

The portion classified at 40.5% solids contained 84% by weight of particles finer than 2 microns, and had an unbleached G.E. brightness of 85.8, a bleached brightness of 87.6 and titanium content of 1.70% (as $TiO_2$).

The method of concentrating and removing titanium minerals by high solids separation and/or classification contemplated by this invention may be used with clays of widely varying particle size distribution, either worked (pugged, kneaded, etc.) or unworked. Considerably better results have been obtained with coarser clay fractions and fractured clays than with crude clays. As mentioned above, fractured clays appear to be distinctive with respect to being processed in accordance with this invention, since at low recovery rates, relatively low solids sedimentation can be used to achieve effective titanium removal.

The conditions under which the sedimentation takes place are not critical. For instance, the settling may be carried out at various temperatures such as from 35° F. to 110° F. or higher or lower, if desired. As mentioned above, the sedimentation may be carried out as a gravity process or in a centrifuge or similar device. The optimum solids levels used in the process may differ somewhat if centrifugal forces are employed.

The equipment used is likewise not critical, but may be any which is currently available to the trade.

The process may be carried out continuously or as a batch process. Continuous processes will generally require the recycling of the coarse materials of relatively higher titanium content. This invention contemplates that the materials which are sedimented may be a valuable source of titanium minerals.

The forms of invention herein shown and described are to be considered only as illustrative. It will be apparent to those skilled in the art that numerous modifications may be made therein without departure from the scope of the invention or the scope of the appended claims.

We claim:

1. A method of removing titanium minerals from a kaolinitic clay which consists of mixing a clay containing titanium minerals with water and a dispersing agent, the amount of dispersing agent being about the minimum dosage necessary to form a hard sediment when the clay-water slurry is classified, forming a high solids suspension of clay in water wherein said suspension contains more than about 40% by weight of clay solids, permitting said titanium minerals to settle out of said suspension, and recovering at least some of said clay as suspended clay having a reduced titanium minerals content.

2. A method as described in claim 1, wherein said clay is crude clay.

3. A method as described in claim 1, wherein at least 40% by weight of said clay is permitted to settle out of said suspension with said titanium compounds.

4. A method as described in claim 1, wherein said clay is the relatively coarse residue of crude clay which has had at least some coating grade clay removed therefrom.

5. A method as described in claim 4, wherein said clay is the relatively coarse residue of crude clay which has had at least some filler grade clay removed therefrom.

6. A method as described in claim 5 wherein said high solids suspension contains between from more than about 40% up to 65% by weight of solids.

7. A method as described in claim 5 wherein said high solids suspension contains from about 45% to about 55% by weight.

8. A method as described in claim 5, wherein at least 30% by weight of said clay is permitted to settle out of said suspension.

9. A method as described in claim 4 wherein said high solids suspension contains between from more than about 40% up to 65% by weight of solids.

10. A method as described in claim 9 wherein said high solids suspension contains from about 45% to about 55% by weight.

11. A method as described in claim 9 wherein at least 30% by weight of said clay is permitted to settle out of said suspension.

12. A method as described in claim 4, wherein said clay is the relatively coarse residue of crude clay which has been subjected to delamination by kneading and has had at least some delaminated clay removed therefrom.

13. A method as described in claim 12, wherein said suspension contains more than about 40 and up to about 60% by weight of clay solids.

14. A method as described in claim 13, wherein said suspension contains from about 45 to about 55% by weight of clay solids.

15. A method of producing a kaolinitic clay having a high brightness which consists of mixing water with a coarse clay residue of a high intensity kneading process or soft-media fracturing process, said coarse clay containing at least some titanium minerals, forming a suspension of said coarse clay in water using about the minimum amount of dispersing agent necessary to form a hard sediment when the clay-water suspension is classified, said suspension containing at least about 30% by weight clay, permitting at least some of said clay and at least some of said titanium minerals to settle out of said suspension, and recovering at least some of said clay as unsedimented clay having a reduced titanium minerals content.

16. A method as described in claim 15, wherein at least 70% by weight of said clay is permitted to settle out of said suspension.

17. A method as described in claim 15, wherein said recovered clay is subjected to a further fracturing operation using hard media.

References Cited

UNITED STATES PATENTS

| | | | |
|---|---|---|---|
| 2,569,680 | 10/1951 | Leek | 209—5 X |
| 2,987,473 | 6/1961 | Millman | 209—5 X |
| 3,097,801 | 7/1963 | Duke. | |
| 3,171,718 | 3/1965 | Gunn. | |
| 3,343,973 | 9/1967 | Billue | 23—110 X |
| 3,371,988 | 3/1968 | Maynard | 106—72 X |
| 3,432,030 | 3/1969 | Olivier | 209—5 |
| 3,439,801 | 4/1969 | Morris | 209—5 |
| 3,446,348 | 5/1969 | Sennett | 209—5 |

FRANK W. LUTTER, Primary Examiner

R. HALPER, Assistant Examiner

U.S. Cl. X.R.

23—110; 106—72; 209—5; 241—16, 20